United States Patent Office 3,333,023
Patented July 25, 1967

3,333,023
METHOD OF PREPARING VINYL CASTINGS
Alexander Christian Bristol, Stamford, Conn., assignor to American Cyanamid Company, Stamford, Conn., a corporation of Maine
No Drawing. Filed June 23, 1965, Ser. No. 466,467
5 Claims. (Cl. 260—872)

This invention relates to a method for the production of vinyl castings. More particularly, this invention relates to a method for decreasing the curing time in the casting of vinyl syrups. Still more particularly, this invention relates to a method for decreasing the curing time in vinyl syrup casting procedures which comprises blending a polyester resin composed of (1) fumaric acid, (2) a polyethylene glycol and (3) certain glycol diacrylates with the vinyl syrup, placing the resilient blend in a casting cell and curing the resin blend.

The casting of vinyl syrups into cast sheets is one of the most widely used commercial methods for the production of such products. Various techniques and modifications of these known procedures have been the subject matter of various patents, see, for example, U.S. Patent No. 3,131,242. All the procedures, however, utilize prepolymer syrups composed of the vinyl polymer, the vinyl monomer, catalyst and a mold lubricant. The prepolymer syrup is then poured into an appropriately dimensioned casting cell composed of two glass plates having a gasket interposed between them and clamps around their outer edges to maintain a sealed system. The cell is then heated to the appropriate polymerization temperature until the desired cast sheet is produced.

Procedures of this type are economically feasible and result in excellent, uniform products. One problem, however, which has plagued the industry is the length of time necessary to completely polymerize the polymer syrup. The usual time for completion of the reaction ranges from about 8 to 20 hours or more. It can readily be seen that reduction of this curing or casting time enables the production of a larger volume of product per year.

Known attempts to reduce the curing time in vinyl casting procedures have failed. One method tried was to speed up the reaction by heating to higher temperatures. This resulted in a violent exotherm and the subsequent destruction of the casting cell via cracking of the glass (as by thermal shock) or by rapid expansion of boiling monomer pushing the gasket away from the cell perimeter. Other attempts have resulted in similar results.

I have now found a method of reducing the curing time necessary to produce cast vinyl sheet. I have found that I can reduce the curing time from 8-20 hours to 2-4 hours without sacrificing any of the advantageous results achieved during the longer curing cycle. Furthermore, the resultant sheets are comparable in properties to those produced by known methods.

It is therefore an object of the present invention to provide a method for the production of vinyl casings.

It is a further object of the present invention to provide a method for decreasing the curing time in the casting of vinyl syrups.

It is a further object of the present invention to provide a method for decreasing the curing time in vinyl syrup casting procedures which comprises blending the vinyl syrup with a polyester resin composed of (1) fumaric acid, (2) a polyethylene glycol and (3) certain glycol diacrylates, placing the resultant blend in a casting cell and curing the resin blend to a cast sheet.

These and further objects of the present invention will become more apparent to those skilled in the art upon reading the more detailed description set forth hereinbelow.

As mentioned above, I have found that in the casting of vinyl polymers, the addition of certain polyester resin compositions to the vinyl syrups, prior to the casting thereof, reduces the curing time necessary at least 50%.

The polyester resins found useful for this curing time reduction are known in the art and are disclosed in copending application, Ser. No. 307,812, now U.S. Patent No. 3,264,372, filed Sept. 10, 1963, to Deichert and Webb. They are composed of (1) the esterification reaction product of fumaric acid and certain polyethylene glycols and (2) certain glycol diacrylates.

The first component of the polyester resin is produced by reacting fumeric acid with a polyglycol containing between 6 and 26 carbon atoms until the acid number of the reaction product is below about 30.

Among the polyethylene glycols which may be used to esterify the fumaric acid are triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, tridecaethylene glycol and the like. These polyethylene glycols may be used either singly or in combination with one another. The fumaric acid and the polyethylene glycol should be reacted in substantially equimolar proportions, since each is, for the purposes of esterification, difunctional. For preferred processing results, a slight excess amounting to about 5 to 20% of the polyethylene glycol should be used over and beyond the amount stoichiometrically calculated to esterify substantially all of the carboxyl groups in the fumaric acid.

The second component of the polyester resin, namely, the glycol diacrylates, is produced by esterifying an α,β-ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol, bis-(4-hydroxybutyl)-ether and the like. Among the monoglycols which may be used to esterify the acrylic or methacrylic acids are ethylene glycol, propylene glycol, the propanediols-1,2 and 1,3, the butanediols-1,2; 1,3; and 1,4 and the like. These glycol diacrylates can be used with the glycol fumarates either singly or in combination with one another. However, whether used singly or in combination, the glycol diacrylate should be present in the total composition in an amount varying between about 10% and 40%, by weight, based on the total weight of said glycol fumarate and said glycol diacrylate.

The polyester resin thus produced is then added to the vinyl syrup in amounts ranging from about 1–15%, by weight, based on the total weight of the blend, preferably 5–10%, same basis. It is necessary to add to either the polyester resin, or the vinyl syrup, from about 0.003% to about 10%, by weight, based on the weight of the total composition, of a polymerization catalyst or initiator, examples of which include benzoyl peroxide, isopropyl percarbonate, t-butyl hydroperoxide, di-t-butyl peroxide, t-butyl perbenzoate, azobisisobutyronitrile, cumene hydroperoxide, or others equally well known in the art.

Although my novel process may be performed using any castable vinyl polymer, it is preferred that the various acrylic and methacrylic polymers be used. These acrylic polymers are produced from monomers having the formula (I) 

wherein R is an alkyl group of 1–6 carbon atoms, inclusive, and $R^1$ is hydrogen or a methyl group. Examples of representative monomers are methyl acrylate, ethyl acrylate, n-propyl acrylate, isopropyl acrylate, n-butyl acrylate, t-butyl acrylate, isobutyl acrylate, amyl acrylate, hexyl acrylate and their corresponding methacrylates, especially methyl methacrylate.

These monomers are generally present, when using an acrylic syrup, in amounts ranging from about 60% to 100%, by weight, with a corresponding amount of polymer from about 0% to 40%.

The acrylics may be used as homopolymers or copolymers as long as they are compatible with the above enumerated polyester resins. When copolymers are employed, any monomer or monomers copolymerizable with the acrylic monomer may be used. Mixtures of the monomers of Formula I may also be used. Examples of comonomers which can be copolymerized with the monomers of Formula I, and which can be polymerized either singly or in a plurality (two, three, four or any desired number), are such monomers as the vinyl cyclic compounds (including monovinyl aromatic hydrocarbons), e.g., styrene, o-, m-, and p-chlorostyrenes, -bromostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, trivinyl benzene, allyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated amides, for instance, acrylamide, and N-substituted acrylamides, e.g., N-methylol acrylamide, N-methyl acrylamide, N-phenyl acrylamide, etc.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide.

More specific examples of allyl compounds that can be copolymerized with the compounds of Formula I are allyl alcohol, methallyl alcohol, diallyl carbonate, diallyl dichlorosilane, triallyl tricarballylate, triallyl cyanurate, triallyl isocyanurate, ethylene glycol bis allyl carbonate, etc. Other examples of allyl compounds that may be employed are given, for example in U.S. Patent No. 2,510,503, issued June 6, 1950.

Among the comonomers which are preferred for use in carrying our invention into effect are, for example, compounds such as acrylonitrile, and other compounds, e.g., the various substituted acrylonitiriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Other monomers compolymerizable with the instant novel monomers are given, for instance, in United States Patent No. 2,601,572, dated June 24, 1952, where examples are given both by classes and species.

Other polymers which may be used in the practice of the process of the instant invention include polymers of acrylonitrile, allyl methacrylate, ethylene glycol bis allyl carbonate, styrene, diallyl phthalate and the like as homopolymers or copolymers with the polymerizable comonomers listed hereinabove.

Once the polyester resin and the prepolymer syrup components are blended in the amounts set forth hereinabove, the blend is then poured into a casting cell of desired dimensions and cured. The curing is generally conducted at 40° C. to 150° C. for from 0.5 to 4 hours, depending upon the thickness of the cell, i.e. shorter curing times are permissible for thinner casting cells. Additionally, two or more curing cycles may be used, i.e. curing for a certain time at a low temperature and then at a higher temperature for an additional length of time.

Various additives such as dyes, pigments, UV absorbers, such as those disclosed in U.S. Patent No. 2,777,828, infrared absorbers photochromic materials, fillers, surface active agents, mold release agents, stabilizers, etc. in minor amounts, may also be added to the blend before the casting thereof.

The following examples are set forth for purposes of illustration only and are not to be construed as limitations on the instant invention except as set forth in the appended claims. All parts and percentages are by weight unless otherwise indicated.

*Example 1*

To 90 parts of an acrylic syrup composed of 70% of methyl methacrylate, 30% of poly(methyl methacrylate) and 0.006% of azobisobutyronitrile are added 10 parts of a polyester resin composed of 79% of triethyleneglycol fumarate (produced by reacting 1.03 moles of triethylene glycol with 1 mole of fumaric acid), 20% of tetraethyleneglycol dimethacrylate and 1% of benzoyl peroxide.

The resultant blend is poured into a gasketed casting cell 4′ x 8′ x .125″. The cell is sealed and then cured in an air oven at 70° C. for 1 hour and 100° C. for an additional hour. The resultant transparent cast sheet has a Barcol hardness of 46.

*Example 2*

Following the procedure of Example 1, 90 parts of ethylene glycol bis allyl carbonate and 10 parts of the polyester resin of Example 1 are blended and added to a casting cell. The cell is heated for 1 hour at 100° C. The result casting is clear and hard.

*Example 3*

(Comparative)

Following the procedure of Example 1, a blend of only methyl methacrylate monomer and catalyst is poured into a casting cell and cured for 1 hour at 70° C. and 1 hour at 100° C. The monomer boils away due to a runaway exotherm.

*Example 4*

(Comparative)

Following the procedure of Example 3, methyl methacrylate monomer and catalyst is poured into a casting cell and cured 16 hours at 55° C. and 1 hour at 70° C. The resulting casting is clear and has a Barcol hardness of 44.

*Example 5*

The procedure of Example 1 is again followed except that 85 parts of an acrylic syrup composed of 80% methyl methacrylate monomer, and 20% of poly(methyl methacrylate) is blended with 15 parts of the polyester resin of Example 1. The resultant blend is poured into a casting cell and cured 90 minutes at 70° C. and 1 hour at 100° C. The casting is clear and hard.

*Example 6*

The procedure of Example 1 is again followed except that 85 parts of an acrylic syrup comprised of 60% methyl methacrylate and 40% poly(methyl methacrylate) are blended with 15 parts of the polyester resin of Example 1. The blend is poured into a casting cell and heated 45 minutes at 70° C. and 1 hour at 100° C. The resultant casting is clear and hard.

*Example 7*

The procedure of Example 1 is again followed except that the polyester resin is composed of fumaric acid and octaethylene glycol. The resulting casting is clear and tough.

*Example 8*

The procedure of Example 1 is again followed except that the polyester resin is composed of fumaric acid and tetraethylene glycol. The resulting casting is clear and mar resistant.

*Example 9*

The procedure of Example 1 is again followed except that the tetraethylene glycol dimethacrylate is replaced by ethylene glycol dimethacrylate. The resultant cast sheet has a Barcol hardness of 49.

*Example 10*

Again following the procedure of Example 1, except that dipropylene glycol dimethacrylate is substituted for the tetraethylene glycol dimethacrylate, a clear, mar-resistant cast sheet is produced.

I claim:
1. A method for the production of a transparent, cast polymer sheet which comprises (a) blending (A) a castable vinyl monomer selected from the group consisting of acrylates, methacrylates, and ethylene glycol bis allyl carbonate with (B) from about 1 to 15%, by weight, based on the total weight of (A) and (B), of a polyester resin consisting essentially of (1) the esterification reaction product of fumaric acid and a polyethylene glycol having 6–26 carbon atoms, inclusive, and (2) from about 10 to 40%, by weight, based on the total weight of (1) and (2), of a glycol diacrylate which is the reaction product of a glycol selected from the group consisting of polyglycols of 4 to 8 carbon atoms and monoglycols of 2 to 4 carbon atoms and an acid selected from the group consisting of acrylic acid and methacrylic acid, (b) placing the resultant blend in a casting cell and (c) curing the blend for not more than 4 hours at a temperature of not more than 100° C.

2. A method according to claim 1 wherein said castable vinyl monomer has the formula

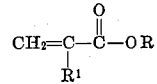

wherein R is an alkyl group of 1 to 6 carbon atoms inclusive and $R^1$ is selected from the group consisting of hydrogen and a methyl radical.

3. A method according to claim 1 wherein said castable vinyl monomer is methyl methacrylate.

4. A method according to claim 1 wherein said polyester resin is composed of the esterification reaction product of fumaric acid and triethylene glycol and said glycol diacrylate is tetraethylene glycol dimethacrylate.

5. A method according ot claim 4 wherein castable vinyl monomer is methyl methacrylate.

References Cited

UNITED STATES PATENTS

| | | | |
|---|---|---|---|
| 2,636,018 | 4/1953 | Rubens et al. | 260—861 |
| 3,149,021 | 9/1964 | Geopfert et al. | 260—872 |
| 3,222,421 | 12/1965 | Lundberg | 260—862 |

FOREIGN PATENTS 1,167,708  7/1956  France.

OTHER REFERENCES

Boenig: "Unsaturated Polyesters," Elsevier Publishing Co., New York, 1964.

Schildknecht: Vinyl and Related Polymers, pages 208–211, 1958.

MURRAY TILLMAN, *Primary Examiner.*

GEORGE F. LESMES, *Examiner.*

J. T. GOOLKASIAN, *Assistant Examiner.*